US007616347B2

United States Patent
Li et al.

(10) Patent No.: US 7,616,347 B2
(45) Date of Patent: Nov. 10, 2009

(54) SYSTEM AND METHOD FOR MULTI-BIT HALFTONING

(75) Inventors: Hong Li, Superior, CO (US); Mikel John Stanich, Longmont, CO (US); Gerhard R. Thompson, Wappingers Falls, NY (US); Chai Wah Wu, Poughquag, NY (US)

(73) Assignee: International Business Machines Corporation, Armonk, NY (US)

( * ) Notice: Subject to any disclaimer, the term of this patent is extended or adjusted under 35 U.S.C. 154(b) by 752 days.

(21) Appl. No.: 11/117,426

(22) Filed: Apr. 29, 2005

(65) Prior Publication Data

US 2006/0244981 A1 Nov. 2, 2006

(51) Int. Cl.
*H04N 1/405* (2006.01)
(52) U.S. Cl. ...................... 358/3.06; 358/3.13
(58) Field of Classification Search ............ 358/3.06, 358/3.01, 1.9, 1.1, 3.13; 349/196, 193
See application file for complete search history.

(56) References Cited

U.S. PATENT DOCUMENTS

| 4,914,524 | A | * | 4/1990 | Kimura | 358/462 |
| 5,291,311 | A | | 3/1994 | Miller | |
| 5,535,020 | A | * | 7/1996 | Ulichney | 358/3.13 |
| 5,633,729 | A | * | 5/1997 | Smith et al. | 382/251 |
| 5,787,238 | A | | 7/1998 | Wang | |
| 5,859,955 | A | | 1/1999 | Wang | |
| 6,014,226 | A | | 1/2000 | Harrington et al. | |
| 6,184,969 | B1 | * | 2/2001 | Fergason | 349/196 |
| 6,252,679 | B1 | | 6/2001 | Wang | |
| 6,603,573 | B1 | | 8/2003 | Adler et al. | |
| 6,714,318 | B1 | | 3/2004 | Morris, III et al. | |
| 6,747,758 | B1 | | 6/2004 | Nishida | |

* cited by examiner

*Primary Examiner*—Thomas D Lee
*Assistant Examiner*—Stephen M Brinich
(74) *Attorney, Agent, or Firm*—Douglas W. Cameron, Esq.; McGinn IP Law Group, PLLC

(57) ABSTRACT

A method (and system) of multi-bit halftoning includes comparing values of an image to threshold values of a halftone threshold matrix, and generating output values that provide a greater than minimum level of contrast.

31 Claims, 7 Drawing Sheets

| 23 | 81 | 124 | 103 | 30 | 1 |
|---|---|---|---|---|---|
| 74 | 95 | 226 | 175 | 88 | 37 |
| 117 | 219 | 255 | 233 | 182 | 110 |
| 153 | 211 | 248 | 240 | 190 | 132 |
| 66 | 168 | 204 | 197 | 161 | 45 |
| 16 | 59 | 146 | 139 | 52 | 8 |

| 47 | 72 | 90 | 81 | 50 | 37 |
|---|---|---|---|---|---|
| 69 | 78 | 134 | 112 | 75 | 53 |
| 87 | 131 | 146 | 137 | 115 | 84 |
| 102 | 127 | 143 | 140 | 118 | 93 |
| 65 | 109 | 124 | 121 | 106 | 56 |
| 44 | 62 | 99 | 96 | 59 | 40 |

SYSTEM AND METHOD FOR MULTI-BIT HALFTONING

BACKGROUND OF THE INVENTION

1. Field of the Invention

The present invention generally relates to a system and method for multi-bit halftoning. In particular, the present invention is directed to a system and method for multi-bit halftoning that avoids smooth textures for intermediate levels.

2. Description of the Related Art

Generally, digital halftoning is accomplished by either bi-tonal or multi-tonal halftoning methods. In general, bi-tonal digital halftoning converts a continuous tone image into a halftone image including a pattern of equal intensity dots. Each dot within the bi-tonal halftone image either exists (black) or does not exist (white), i.e. a bi-tonal image.

More specifically, bi-tonal digital halftoning converts a plurality of digitized intensity values representing a continuous tone image into a plurality of halftone dots, where each halftone dot is either white or black and the ratio of white to black dots, in the halftone cell, is related to the magnitude of the corresponding intensity values in that region. The intensity values are typically generated by periodically sampling a continuous tone image using an optical scanner.

One method of such spatially periodic sampling would be to sample on a square grid. Each intensity value represents the image intensity in an immediate area surrounding the location within the continuous tone image from which the intensity value sample was taken. Typically, each intensity value is quantized such that the intensity corresponds to one of a plurality of levels known as gray levels. Quantization permits each intensity value to be represented by a digital value and to be processed by digital circuitry into a halftone image. For instance, if the intensity values are quantized into 256 levels, i.e., a 256 level gray scale, each of the intensity values can be represented by an eight-bit digital word.

Commonly in bi-tonal digital halftoning, intensity values are mapped into a spatial area on the halftone image known as a halftone cell. Each halftone cell includes a plurality of pixels (or dots as stated above), each having a bi-tonal value, i.e., either black or white.

In operation, a bi-tonal digital halftoning system compares each intensity value sample to an element in a matrix of modulation levels and generates a halftone pixel or dot corresponding to the comparison.

As is known in the art, the previously described halftoning process is useful in halftoning color images by repeating the bi-tonal process for each primary color, e.g., red, blue, and green, or cyan, magenta, and yellow, and, subsequently, overlaying the color halftone images with proper registration.

More and more printers are capable of printing pixels of various intensity values. The varying intensity values mean that each pixel may require more than one bit to describe its output intensity level. One halftoning process that takes advantage of this capability is called "multi-bit halftoning." Multi-bit (i.e. multi-level) halftoning is an extension of bi-tonal halftoning. As the name implies, multi-bit halftoning replaces each black or white pixel in a bi-tonal halftone cell with a pixel having a value selected from a number of values available for each pixel. In essence, multi-bit halftoning redistributes the intensity of a single intensity value into a plurality of intensity values.

Many (output) devices (e.g., printers, displays, etc.) permit a multi-bit pixel display; multi-bit halftoning takes advantage of this capability. For example, thermal printers are capable of printing dot sizes that correspond to various pixel intensity levels.

Additionally, cathode ray tube (CRT) displays can display various pixel intensities by altering an electron beam strength incident upon each pixel within the CRT display.

Typically, output devices, such as printers, are limited as to the number of levels that they can print. In contrast, image capturing devices (e.g., scanners, etc.) can produce large numbers of output levels. Therefore, multi-bit halftoning is used to convert a large number of output levels from a capturing device into a lesser number of levels compatible with a printer. For instance, if a printer may accurately print five (5) levels while a scanner can provide 256 level intensity values, the multi-bit halftoning system must distribute the single 256 level value into one of five possible pixel levels. This is done in such a way that a region of pixels viewed from a distance appears approximately the same as the corresponding region of 256 level values.

To determine the appropriate level for each pixel in a multi-bit halftone cell, an input intensity value is compared to a number of modulation level matrices, i.e., N−1 matrices are used to generate N levels. Generally, the comparison process is similar to that used in bi-tonal halftoning except the comparison process is repeated N−1 times for N−1 matrices. As in bi-tonal halftoning, each matrix contains, as matrix elements, a number of modulation levels. The number of matrix elements is equivalent to the number of pixels in the halftone cell. The output of each comparison is a digital bit, i.e., a signal having a value of either a logical "1" or a logical "0." The output bit value indicates whether the intensity value was greater than the modulation (e.g., threshold) level, i.e., logical "1," or less than the modulation level, i.e., logical "0." Each output bit is stored in an intermediate matrix. Thus, a set of N intermediate matrices containing digital bits is generated. An encoder combines the elements of the intermediate matrices to generate the pixel values for a halftone cell.

Ideally, the smaller the contrast between light and dark pixels that are used to output intermediate gray levels, the smoother and higher the quality of the output image. One multi-bit halftoning method, which relies upon this relationship, is described in U.S. Pat. No. 5,291,311, which is incorporated herein in its entirety. Using this multi-bit halftone method, gray levels, which are equal to one of the printer's output levels, are rendered using only those levels which are closest to the input gray level. Therefore, the output image from these printers at these gray levels is very smooth.

However, certain printers cannot print a uniform intermediate gray level area reliably without having some contrast between neighboring pixels. For example, some electrographic printers cannot reliably print low contrast intermediate levels. Electrographic printers use electromagnetic field to transfer toner on the paper. Low contrast level between neighboring pixels does not create an electro-magnetic field that is strong enough to provide reliable toner transfer.

One conventional method for addressing this problem is known as the "gray-on-edges" method. The gray-on-edges method places intermediate pixel values only on the edges of pixel clusters. Thus, this method makes use of the gray level capability of a printer, but still uses the lightest and darkest pixels in rendering intermediate gray levels. However, this conventional method does not provide the increased quality improvement that may be possible if the contrast levels were reduced.

SUMMARY OF THE INVENTION

In view of the foregoing and other exemplary problems, drawbacks, and disadvantages of the conventional methods and structures, an exemplary feature of the present invention is to provide a method and structure in which a minimum level of contrast is provided for reliable printing when rendering a continuous tone image.

In a first exemplary aspect of the present invention, a method of multi-bit halftoning includes comparing values of an input image to threshold values of a halftone threshold matrix, and generating output values based upon the comparing such that the output values provide a greater than minimum level of contrast.

In a second exemplary aspect of the present invention, a system for multi-bit halftoning includes means for comparing values of an input image to threshold values of a halftone threshold matrix, and means for generating output values such that the output values provide a greater than minimum level of contrast.

In a third exemplary aspect of the present invention, a method for deploying computing infrastructure, comprising integrating computer-readable code into a computing system, includes instructions for comparing values of an input image to threshold values of a halftone threshold matrix, and instructions for generating output values such that the output values provide a greater than minimum level of contrast.

An exemplary embodiment of the present invention maintains a minimum level of contrast between neighboring output pixels for each gray level that is rendered, but does not necessarily result in a maximum contrast between the output pixels.

For the purposes of the present invention, a "minimum level of contrast" is defined as non-neighboring output values of a plurality of distinct output values that are capable of being rendered by a corresponding rendering device.

Further, for the purposes of the present invention, a "maximum level of contrast" is defined as the most extreme output values of a plurality of distinct output values that are capable of being rendered by a corresponding rendering device.

The present invention provides a number of advantages. An exemplary embodiment of the present invention renders an intermediate gray level reliably by providing a minimum level of contrast between neighboring pixels. Therefore, the present invention may easily be used by, for example, electrophotographic printers.

Further, an exemplary embodiment of the present invention avoids transitions between areas of an output image that rely upon halftone patterning and other areas in an output image that do not rely upon halftone patterning, which might be objectionable to an observer.

The present invention always uses a dither halftone operation for all intermediate gray levels. As a result, the present invention avoids transition between a halftone pattern and a smooth region.

Additionally, an exemplary embodiment of the present invention may avoid maximum contrast between pixels, which also improves the quality of the output image.

The invention uses some contrast between neighboring pixels with the available multiple levels to avoid the maximum contrast in bi-level halftone.

Further, an exemplary embodiment of the present invention provides a method and system whereby gray-scales may be printed with less difficulty and while providing a consistent pattern.

BRIEF DESCRIPTION OF THE DRAWINGS

The foregoing and other exemplary purposes, aspects and advantages will be better understood from the following detailed description of an exemplary embodiment of the invention with reference to the drawings, in which:

FIG. 2 illustrates a conventional halftone threshold matrix;

FIG. 3 illustrates an exemplary embodiment of a normalized halftone threshold matrix that corresponds to the conventional halftone threshold matrix of FIG. 2;

DETAILED DESCRIPTION OF EXEMPLARY EMBODIMENTS OF THE INVENTION

Figure 1:
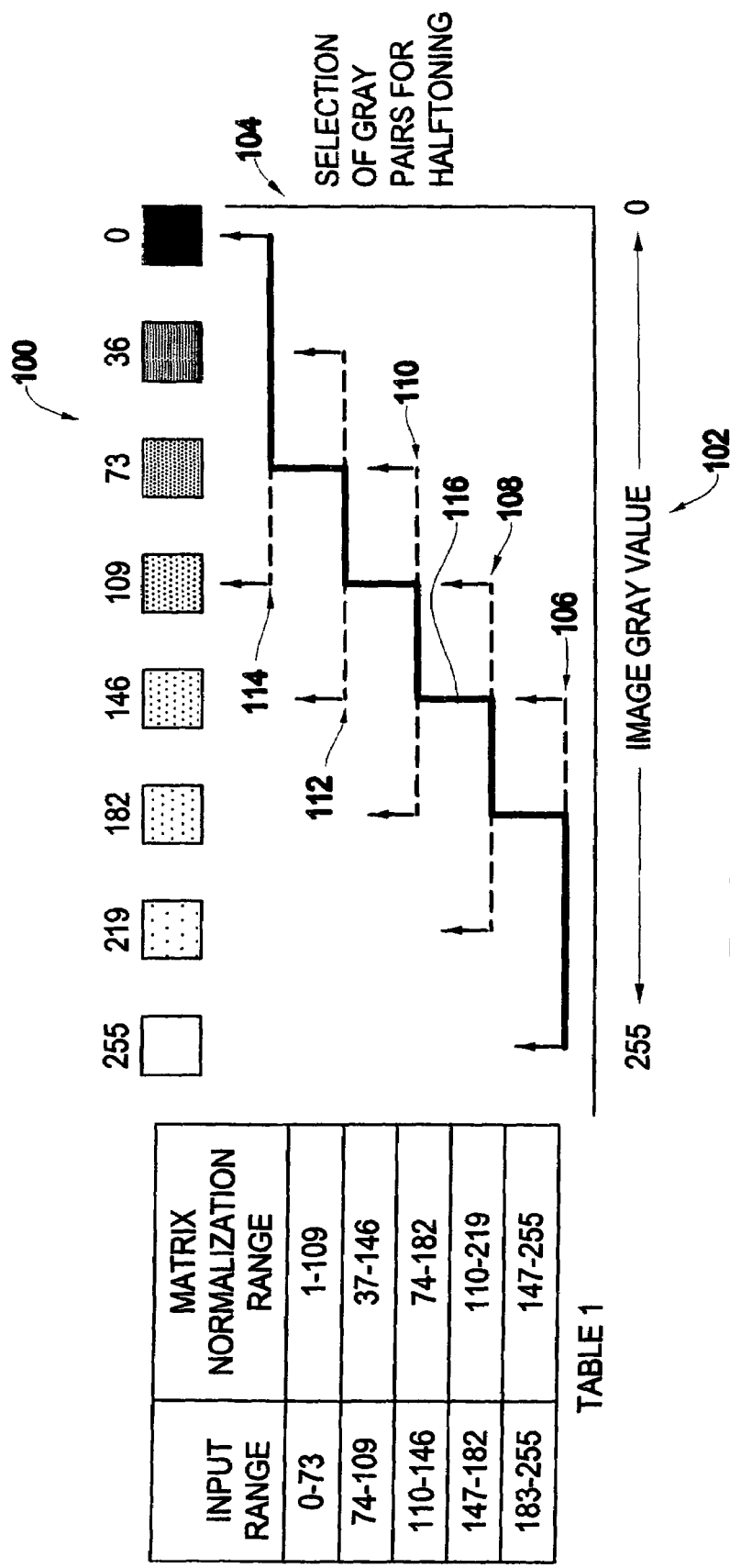
FIG. 1 illustrates a first exemplary embodiment of a method for multi-bit halftoning in accordance with the present invention.
Figure 4:
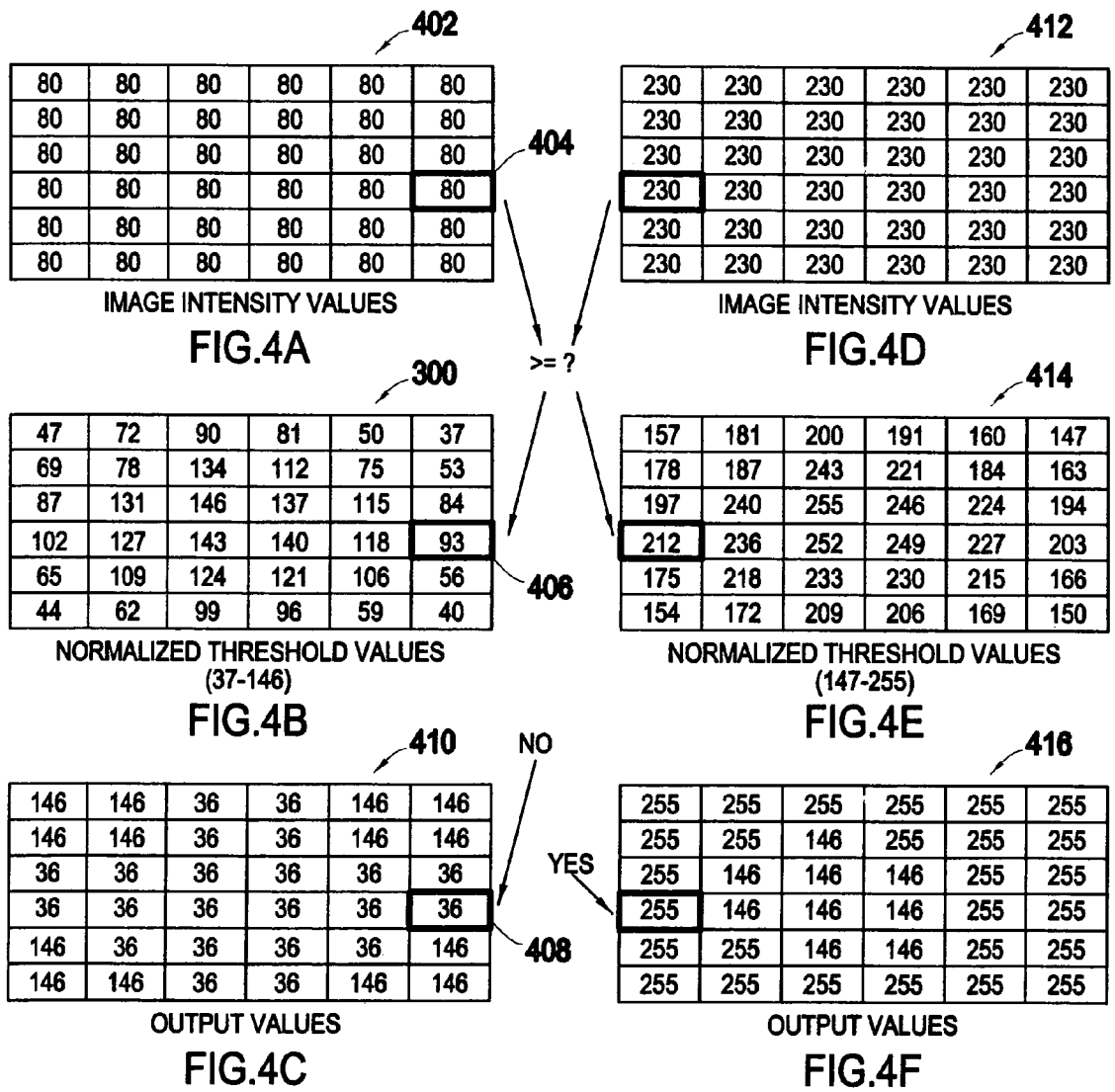
FIGS. 4A through 4F illustrate the operation of an exemplary embodiment of a method and system for multi-bit halftoning in accordance with the present invention.

Referring now to the drawings, and more particularly to FIGS. 1-9, there are shown exemplary embodiments of the method and structures of the present invention.

An exemplary embodiment of invention as applied to a printer, which is capable of printing eight (8) levels of gray, is illustrated in FIG. 1. FIG. 1 illustrates the eight gray levels 100 that the printer is capable of printing as including 0, 36, 73, 109, 146, 182, 219, and 256. The abscissa axis 102 of the graph represents a continuous range of gray levels from zero (black) to 255 (white) and the ordinate axis 104 represents the selections of gray pairs that are available for each of a set of predetermined ranges of gray levels. This first exemplary embodiment of the present invention spreads the dithering operation across five (5) levels: 106, 108, 110, 112, and 114.

As explained in more detail below, the solid, "staircase" line 116 illustrates the correspondence between the input image gray level and the gray levels that the printer is capable of printing, and, which are, therefore, available for use in the dithering operation in an exemplary embodiment of the present invention.

As illustrated by the table of FIG. 1, for input gray values at level 106 in the range of about 255 to about 183, gray levels at 255 and at 147 are dithered. Similarly, for input gray values at level 108 in the range of about 183 to about 146, gray levels at 219 and at 109 are dithered, and so on.

In this particular exemplary embodiment, only non-adjacent or non-neighboring gray levels are used in the dithering process. For example, for level 108, rather than dithering output gray levels 182 and 146, as has conventionally been done, this particular exemplary embodiment of the present invention dithers output gray levels 219 and 109. This provides a minimum spread across output dithered levels of four. Generally, it is preferable to provide such a minimum contrast spread across as many levels as possible. In this manner, a minimum contrast between gray levels is provided. The only exceptions for this particular exemplary embodiment are when dithering gray levels of 0 and 255, for which only one gray level is output.

An exemplary embodiment of a dither halftone operation in accordance with the present invention may be performed as follows, although those of ordinary skill in the art understand that any bi-level halftone matrix may be used.

An exemplary halftone threshold matrix 200 is illustrated by FIG. 2. The halftone threshold matrix 200 of FIG. 2 may be normalized into the five ranges, such as those illustrated by Table 1 of FIG. 1. In particular, the halftone threshold matrix of FIG. 2 may be normalized into the following five ranges: 1-109, 37-146, 74-182, 110-219, and 147-255, which correspond, respectively, to the levels 114, 112, 110, 108, and 106 of FIG. 1.

FIG. 3 illustrates an exemplary halftone threshold matrix 300 that is normalized for level 112 (FIG. 1) that ranges from output gray level 37 to 146 based upon the halftone threshold matrix of FIG. 2.

FIGS. 4A-4F illustrate how one exemplary embodiment of the present invention may process image intensity values. FIG. 4A illustrates a portion of an image 402 having a constant gray level of 80. For the pixel 404 in the image of FIG. 4A, the corresponding gray level of 80 is compared to a corresponding position 406 within halftone threshold matrix 300 (see FIG. 4B) that 80 corresponds to a matrix normalization range of between 37 and 146 and that is illustrated by FIG. 3.

The position of pixel 404 corresponds to a position 406 within the normalized halftone threshold matrix 300 that has a threshold value of 93. Since the gray level value of 80 is not greater than or equal to the threshold value of 93, this exemplary embodiment outputs a gray level value of 36 for a corresponding position 408 within an output image 410.

The output image 410 illustrates all of the output values in accordance with this exemplary embodiment of the present invention based upon the input image 402 of FIG. 4A after comparison with the normalized halftone threshold matrix 300 of FIG. 4B.

Similarly, FIGS. 4D-4F illustrate the processing for an input image 412 having a continuous tone gray level of 230 using another normalized halftone threshold matrix 414 corresponding to the gray level of 230, and the output values 416. The output values 416 are based upon a pixel by pixel comparison of the intensity values from the input image 412, to the corresponding threshold values in the normalized halftone threshold matrix 414.

This exemplary inventive method of dithering is useful for a printer that is only capable of outputting gray levels of 0, 36, 73, 109, 146, 182, 219, and 255 stands in stark contrast to conventional methods of dithering. As explained above, for any given input value, these conventional dithering methods have only been capable of selecting between gray pairs that are adjacent to each other. For example, input values of between 0 and 173, have conventionally resulted in an output gray value that is one of 0, 36, or 73, depending upon the relationship of the input value to the threshold(s) for that input value range.

Similarly, for an input value of between 74 and 109, the conventional methods have only been capable of outputting a gray level of 73 or 109 depending upon the relationship between the input value and a threshold value.

In other words, the output halftone images that are provided by conventional methods and systems provide contrast between neighboring pixels at an absolute minimum. This minimum amount of contrast results from the fact that these conventional methods and systems are only capable of selecting between neighboring output levels. For example, a halftone image may only include output pixel gray values of 109 and 73, which are adjacent to each other among the available gray levels.

In contrast to these conventional halftone generating systems and methods, the present invention provides a higher than minimum amount of contrast between neighboring pixels. This is advantageous for improving the quality of output from certain printers that have difficulty printing without a minimum amount of contrast.

One of ordinary skill in the art understands that while the above-description was for a specific exemplary set of output gray levels and a dither spread of four, the present invention works in a similar manner for other values of output gray levels and dither spread. Preferably, the set of output gray levels and dither spread are larger rather than smaller.

Figure 5:
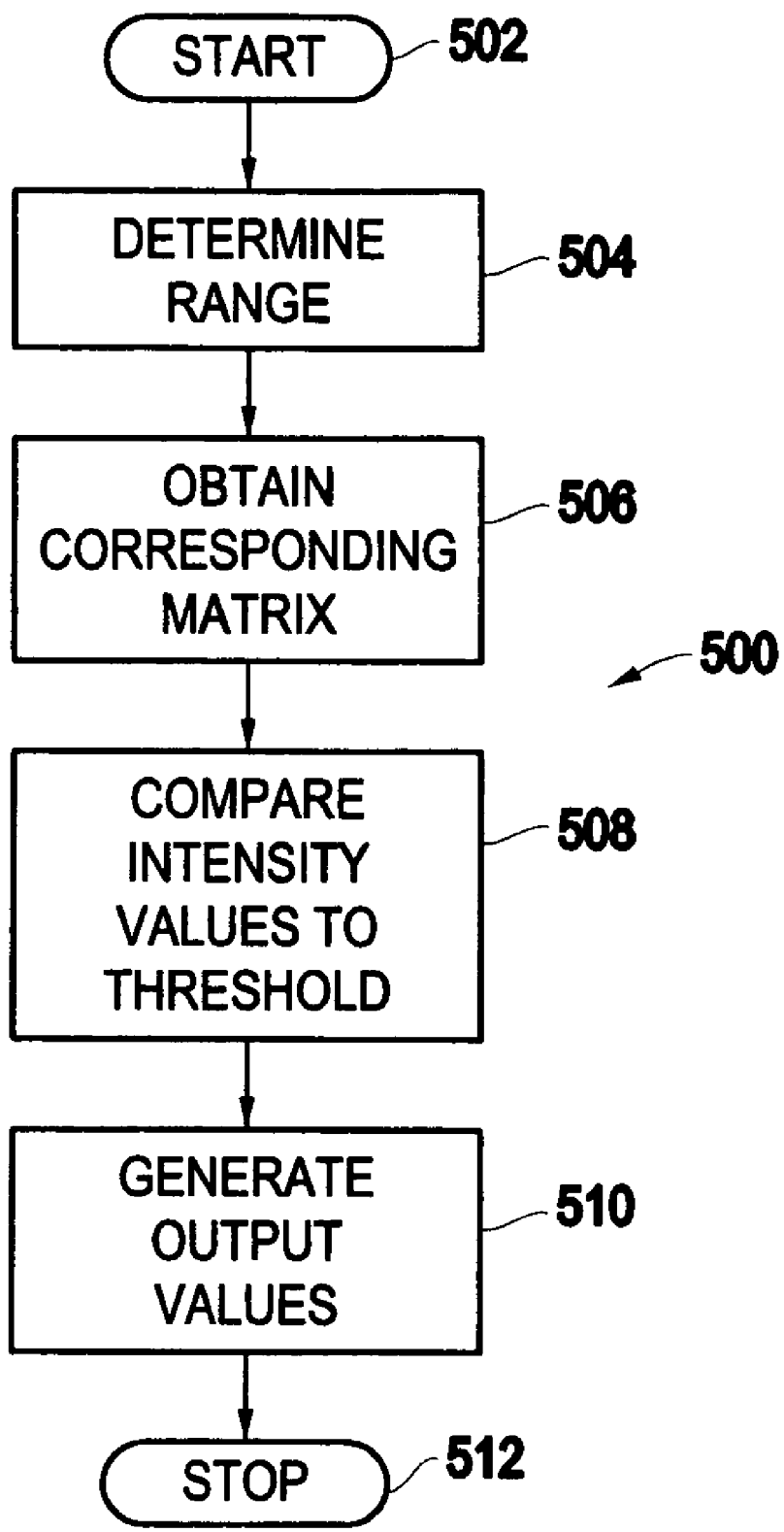
FIG. 5 illustrates a flowchart for an exemplary control routine in accordance with the present invention.

FIG. 5 illustrates a flowchart 500 of a control routine for an exemplary embodiment of the present invention. The control routine starts at step 502 and proceeds to step 504. In step 504, the control routine receives an input image intensity value and determines a corresponding range of available output gray levels and continues to step 506. In step 506, based upon the determination of the corresponding range of available output gray levels, the control routine obtains a corresponding normalized halftone threshold matrix and continues to step 508. In step 508, for each pixel position in the input image, the control routine compares the input intensity value to a corresponding threshold value in the normalized halftone threshold matrix and continues to step 510. In step 510, the control routine generates output values based upon the comparisons performed in step 508 and continues to step 512 where the control routine stops.

Second Exemplary Embodiment

Figure 6:
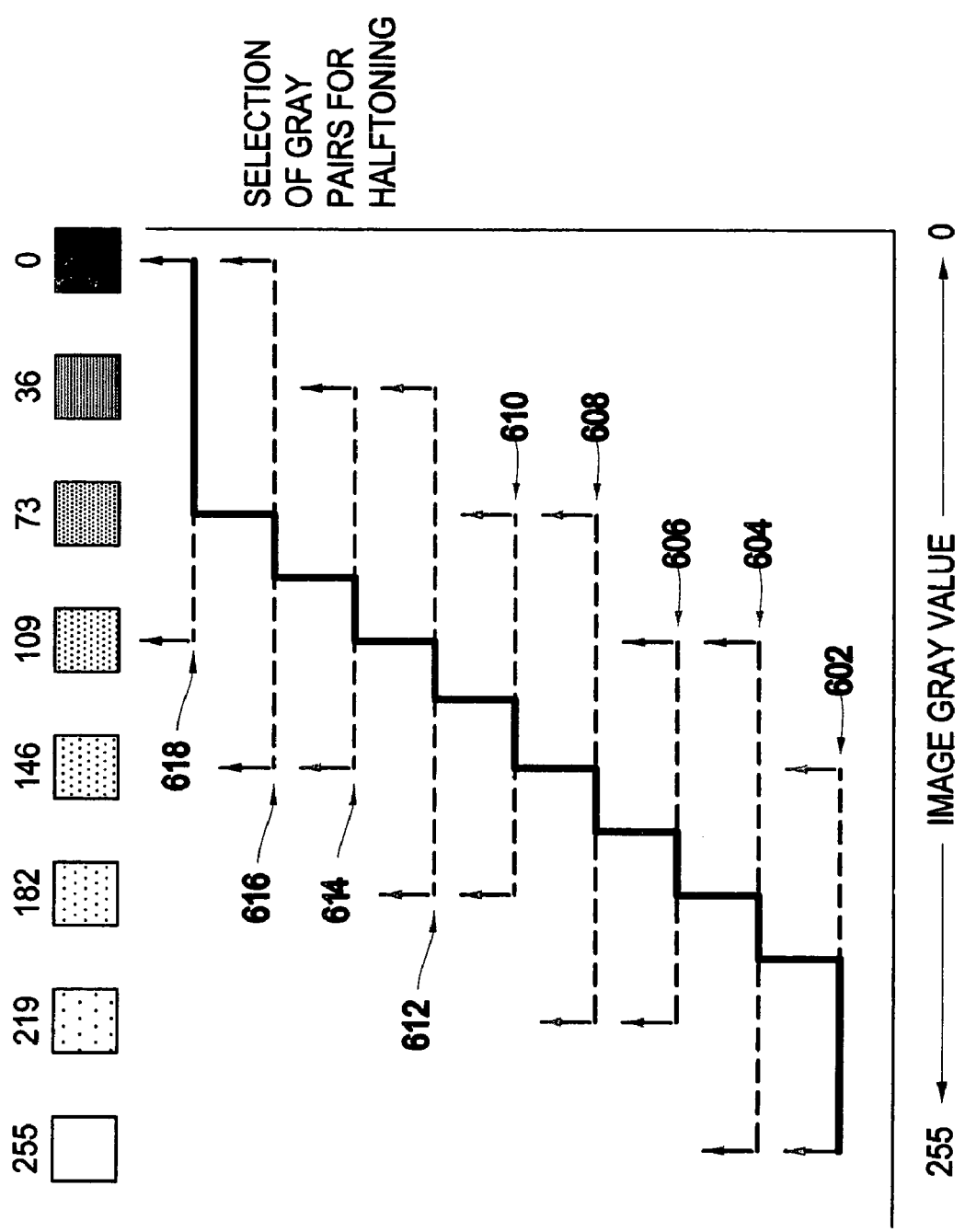
FIG. 6 illustrates a second exemplary embodiment of a method for multi-bit halftoning in accordance with the present invention.

A second exemplary embodiment of the present invention is illustrated by FIG. 6. This exemplary embodiment illustrates a variation of the above halftoning technique that is illustrated in FIG. 1.

Similar to the embodiment described above with reference to FIG. 1, this second exemplary embodiment is for a device that also has the capability of rendering eight (8) distinct levels of gray. However, this second exemplary embodiment of the present invention has nine (9) input value ranges (602, 604, 606, 608, 610, 612, 614, 616, and 618) as opposed to the five (5) input value ranges (106, 108, 110, 112, and 114) of the first exemplary embodiment as shown in FIG. 1.

In addition, for this second exemplary embodiment, the transition between input gray value ranges only changes one of the gray levels that are dithered, as opposed to changing both of the gray levels as illustrated by FIG. 1.

For example, when the first exemplary embodiment of the present invention illustrated by FIG. 1 is transitioned between level 108 and 110, both of the output gray levels that would be dithered were changed from 219 and 109 to 192 and 73. In contrast, in the second exemplary embodiment of the present invention, in a transition from level 604 to level 606 only one of the output gray levels that are dithered are changed from 255 and 109 to 219 and 109.

Further, while the spread between input gray levels are uniform for the above-described embodiments, one of ordinary skill in the art understands that the spread between the input gray levels does not have to be uniform throughout the range of input image gray values. For example, at the low and high ends of the range, the spread may be greater or smaller. In this manner, the spread may be adjusted, for example, in accordance with a printer's technical requirements.

In any case, an exemplary embodiment of the present invention maintains a minimum spread between the halftone gray levels of at least three.

Figure 7:
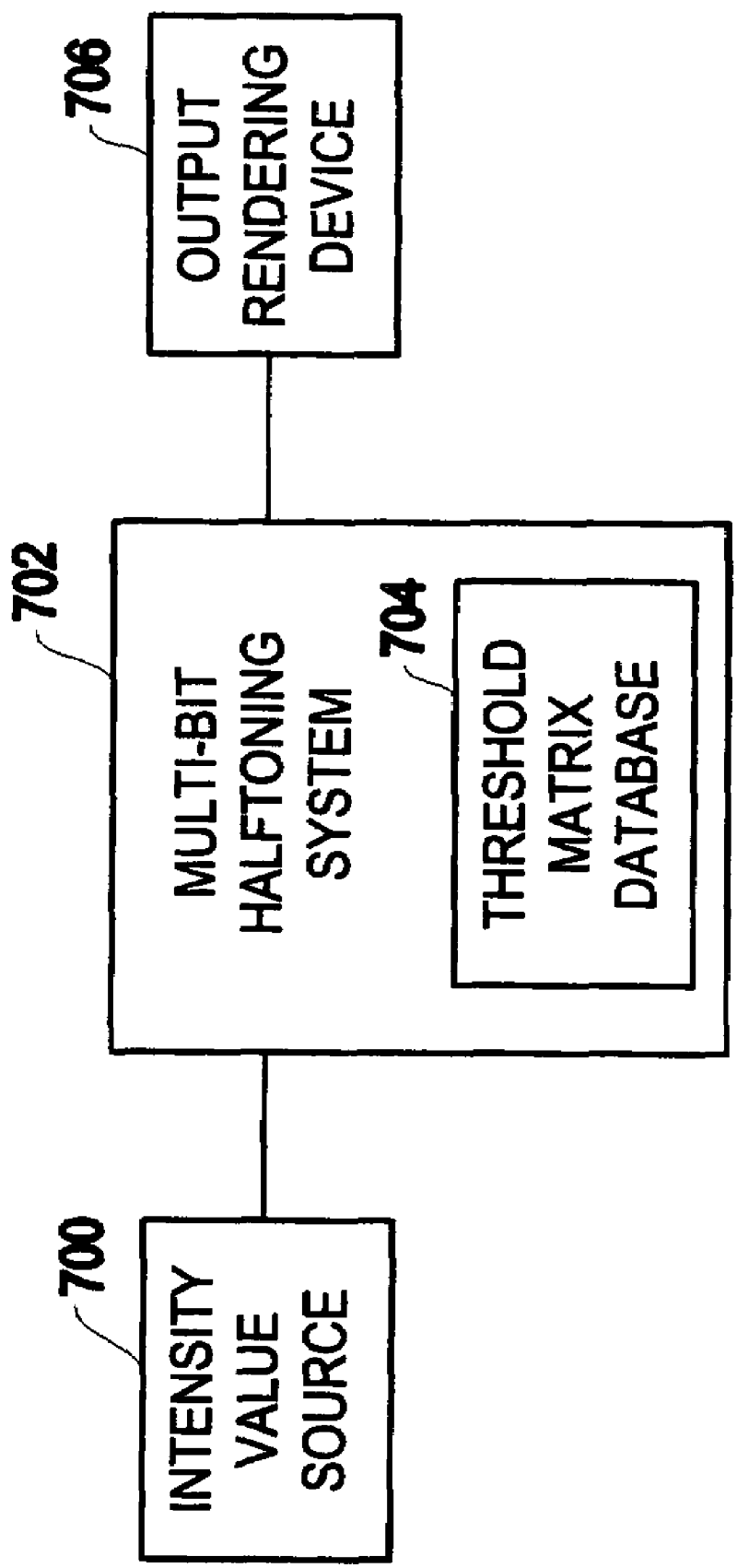
FIG. 7 illustrates an exemplary system 702 for multi-bit halftoning in accordance with the present invention.
Figure 9:
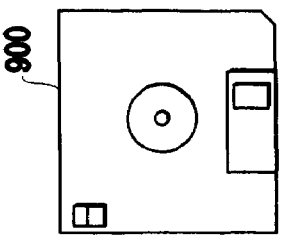
FIG. 9 illustrates a signal bearing medium 900 (e.g., storage medium) for storing steps of a program of a method according to the present invention.

FIG. 7 illustrates a system for multi-bit halftoning 702 as may be operated in conjunction with an intensity value source 700 and an output rendering device 706. An intensity value source 700 may be any source that provides intensity values for an image. For example, the intensity value source may be, for example, an image scanner that scans an input image and that generates intensity values based upon the intensity of the input image being scanned. Alternative, the intensity value source 700 may be, for example, a database that stores the intensity values.

The intensity value source 700 provides intensity values for an image to the multi-bit halftoning system 702. The multi-bit halftoning system 702 may include a threshold matrix database 704 that may store a set of normalized halftone threshold matrices for use by the multi-bit halftoning system 702 to generate output levels to be output to the output rendering device 706. The multi-bit halftoning system 702 generates the output levels in a manner that is similar to the methods described above. The output rendering device 706 receives the output levels from the multi-bit halftoning system 702 and renders the output values.

Figure 8:
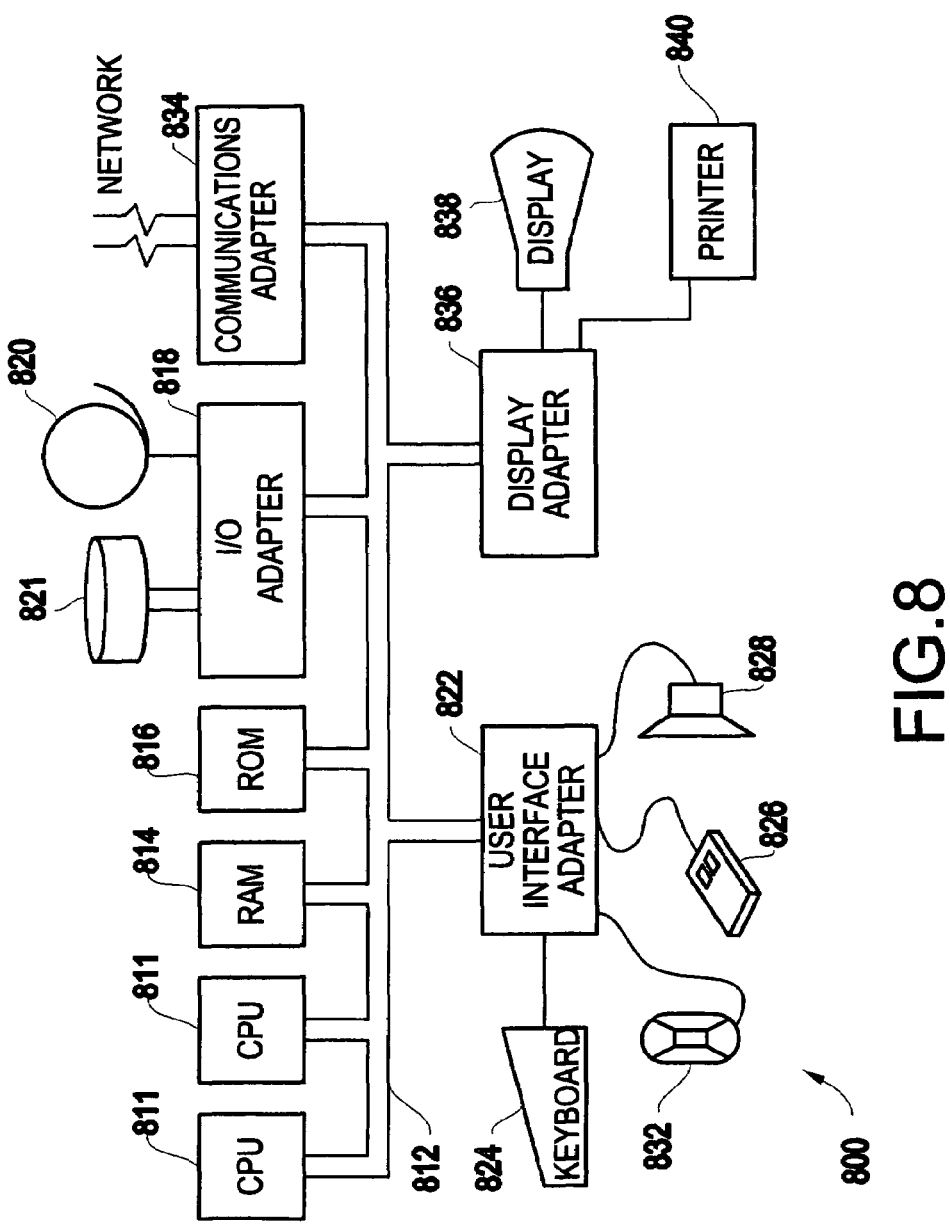
FIG. 8 illustrates another exemplary system 800 for multi-bit halftoning in accordance with the present invention.

FIG. 8 illustrates a typical hardware configuration of an information handling/computer system 800 for use with the invention and which preferably has at least one processor or central processing unit (CPU) 811.

The CPUs 811 are interconnected via a system bus 812 to a random access memory (RAM) 814, read-only memory (ROM) 816, input/output (I/O) adapter 818 (for connecting peripheral devices such as disk units 820 and tape drives 840 to the bus 812), user interface adapter 822 (for connecting a keyboard 824, mouse 826, speaker 828, microphone 832, and/or other user interface device to the bus 812), a communication adapter 834 for connecting an information handling system to a data processing network, the Internet, an Intranet, a personal area network (PAN), etc., and a display adapter 836 for connecting the bus 812 to a display device 838 and/or printer 840.

In addition to the hardware/software environment described above, a different aspect of the invention includes a computer-implemented method for performing the above-described method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

This signal-bearing media may include, for example, a RAM contained within the CPU 811, as represented by the fast-access storage for example. Alternatively, the instructions may be contained in another signal-bearing media, such as a magnetic data storage diskette 900 (FIG. 9), directly or indirectly accessible by the CPU 811.

Whether contained in the diskette 900, the computer/CPU 811, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, compiled from a language such as "C", etc.

The present invention provides a number of advantages. An exemplary embodiment of the present invention renders an intermediate gray level reliably by providing a minimum level of contrast between neighboring pixels. Therefore, the present invention may easily be used by, for example, electrophotographic printers.

Further, an exemplary embodiment of the present invention avoids transitions between areas of an output image that rely upon halftone patterning and other areas in an output image that do not rely upon halftone patterning, which might be objectionable to an observer.

The present invention always uses a dither halftone operation for all intermediate gray levels. As a result, the present invention avoids transition between a halftone pattern and a smooth region.

Additionally, an exemplary embodiment of the present invention may avoid maximum contrast between pixels, which also improves the quality of the output image.

The invention uses some contrast between neighboring pixels with the available multiple levels to avoid the maximum contrast in bi-level halftone.

Further, an exemplary embodiment of the present invention provides a method and system whereby gray-scales may be printed with less difficulty and while providing a consistent pattern.

While the invention has been described in terms of several exemplary embodiments, those skilled in the art will recognize that the invention can be practiced with modification.

For example, while the above-described exemplary embodiments have been described as only processing gray levels, one of ordinary skill in the art understands that the methods and systems of the present invention are equally applicable to levels of colors, such as in a red, green, blue (RGB) or a cyan, magenia, yellow (CMY), color system.

Further, it is noted that, Applicants' intent is to encompass equivalents of all claim elements, even if amended later during prosecution.

What is claimed is:

1. A method of multi-bit halftoning comprising:
   comparing values of an image to threshold values of a halftone threshold matrix; and
   generating output values based upon said comparing such that said output values provide a greater than minimum level of contrast,
   wherein said minimum level of contrast comprises a plurality of non-neighboring output values of a plurality of distinct output values.

2. The method of claim 1, wherein the plurality of non-neighboring output values of the plurality of distinct output values are capable of being rendered by a corresponding rendering device.

3. The method of claim 1, further comprising:
   determining a range for each of said values of said image, wherein said halftone threshold matrix corresponds to said range.

4. The method of claim 1, wherein said generating output values comprises generating a greater than minimum level of contrast for each of a plurality of input value ranges.

5. The method of claim 4, wherein boundaries between each of said plurality of input value ranges correspond to a plurality of output levels that an output device is capable of outputting.

6. A computer-readable storage medium encoded with a computer program that is executable by a digital data processing unit to perform the method of claim 1.

7. A system for multi-bit halftoning, comprising:
means for comparing values of an image to threshold values of a halftone threshold matrix; and
means for generating output values such that said output values provide a greater than minimum level of contrast,
wherein said minimum level of contrast comprises a plurality of non-neighboring output values of a plurality of distinct output values.

8. The system of claim 7, wherein said means for comparing comprises a halftone threshold matrix database.

9. The system of claim 8, wherein said threshold matrix database stores a plurality of normalized halftone threshold matrices.

10. The system of claim 9, wherein each of said plurality of normalized halftone threshold matrices corresponds to one of a plurality of intensity value ranges.

11. The system of claim 10, wherein a boundary for each of said intensity value ranges corresponds to one of a plurality of distinct intensity values capable of being rendered by a device.

12. The system of claim 7, wherein said minimum level of contrast comprises non-neighboring output values of a plurality of distinct output values capable of being rendered by a corresponding rendering device.

13. The system of claim 8, further comprising:
means for determining a range for each of said values of said image, wherein said halftone threshold matrix corresponds to said range.

14. The system of claim 7, wherein said means for generating output values comprises means for generating a greater than minimum level of contrast for each of a plurality of input value ranges.

15. A method for deploying computing infrastructure, comprising integrating computer-readable code into a computing system, the computer-readable code comprising:
instructions for comparing values of an image to threshold values of a halftone threshold matrix; and
instructions for generating output values such that said output values provide a greater than minimum level of contrast,
wherein said minimum level of contrast comprises a plurality of non-neighboring output values of a plurality of distinct output values.

16. The method of claim 15, wherein said instructions for comparing comprise a halftone threshold matrix database.

17. The method of claim 16, wherein said threshold matrix database stores a plurality of normalized halftone threshold matrices.

18. The method of claim 17, wherein each of said plurality of normalized halftone threshold matrices corresponds to one of a plurality of intensity value ranges.

19. The method of claim 18, wherein a boundary for each of said intensity value ranges corresponds to one of a plurality of distinct intensity values capable of being rendered by a device.

20. The method of claim 15, wherein said minimum level of contrast comprises non-neighboring output values of a plurality of distinct output values capable of being rendered by a corresponding rendering device.

21. The method of claim 15, further comprising:
instructions for determining a range for each of said values of said image.

22. The method of claim 21, wherein said halftone threshold matrix corresponds to said range.

23. The method of claim 22, wherein said generating output values comprises generating a greater than minimum level of contrast for each of a plurality of input value ranges.

24. A system for multi-bit halftoning, comprising:
a comparator that compares values of an image to threshold values of a halftone threshold matrix; and
an output value generator that generates output values that provide a greater than minimum level of contrast,
wherein said minimum level of contrast comprises a plurality of non-neighboring output values of a plurality of distinct output values.

25. The system of claim 24, wherein said comparator comprises a halftone threshold matrix database.

26. The system of claim 25, wherein said threshold matrix database stores a plurality of normalized halftone threshold matrices.

27. The system of claim 26, wherein each of said plurality of normalized halftone threshold matrices corresponds to one of a plurality of intensity value ranges.

28. The system of claim 27, wherein a boundary for each of said intensity value ranges corresponds to one of a plurality of distinct intensity values capable of being rendered by a device.

29. The system of claim 24, wherein said minimum level of contrast comprises non-neighboring output values of a plurality of distinct output values capable of being rendered by a corresponding rendering device.

30. The system of claim 25, further comprising:
a processor that determines a range for each of said values of said image, wherein said halftone threshold matrix corresponds to said range.

31. The system of claim 24, wherein said output value generator comprises a generator that generates a greater than minimum level of contrast for each of a plurality of input value ranges.

* * * * *

UNITED STATES PATENT AND TRADEMARK OFFICE
CERTIFICATE OF CORRECTION

| | |
|---|---|
| PATENT NO. | : 7,616,347 B2 |
| APPLICATION NO. | : 11/117426 |
| DATED | : November 10, 2009 |
| INVENTOR(S) | : Li et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1228 days.

Signed and Sealed this

Nineteenth Day of October, 2010

David J. Kappos
*Director of the United States Patent and Trademark Office*